Feb. 7, 1933.   E. I. SPONABLE   1,896,871
FILM SPLICING MACHINE
Filed Feb. 27, 1929   3 Sheets-Sheet 1
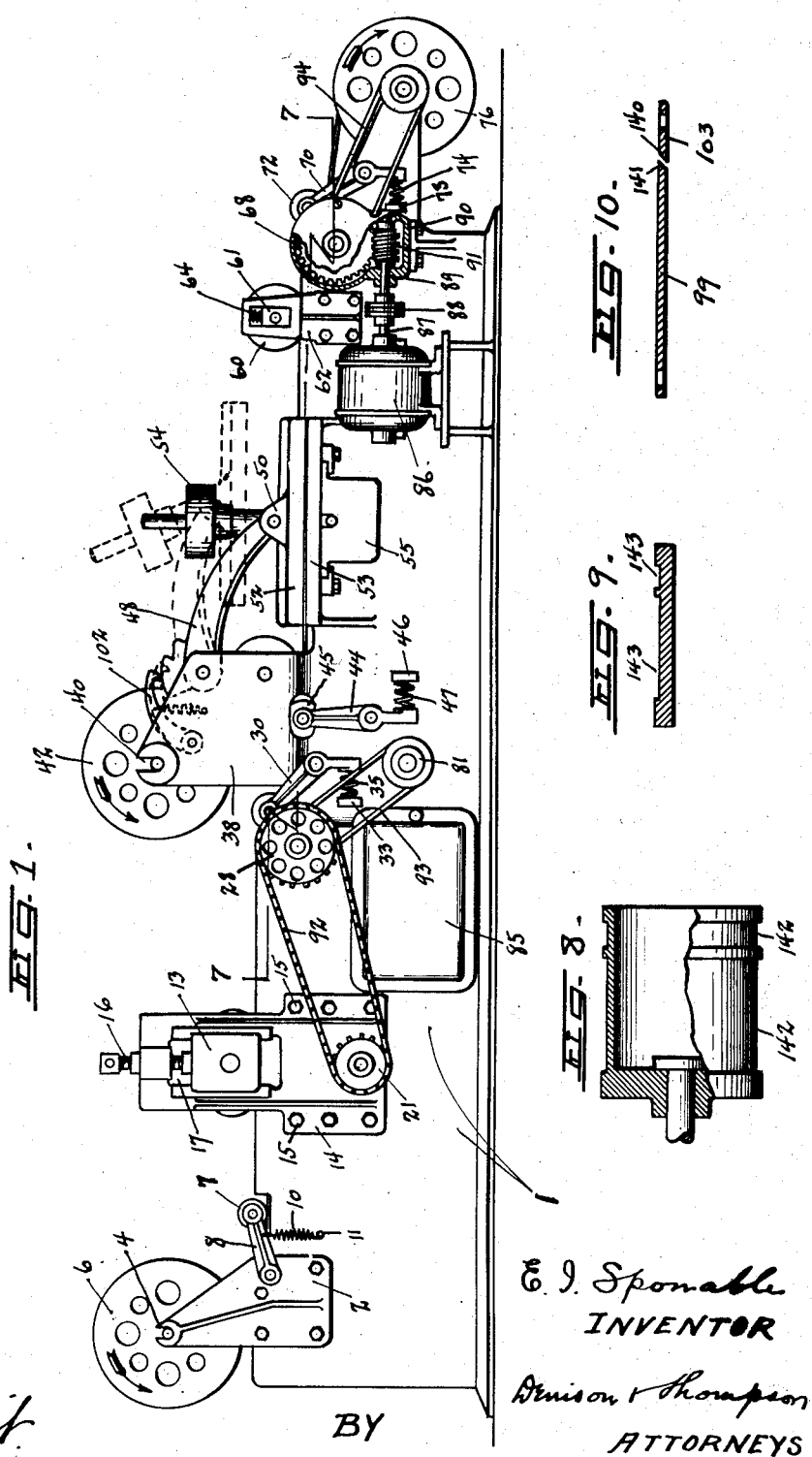

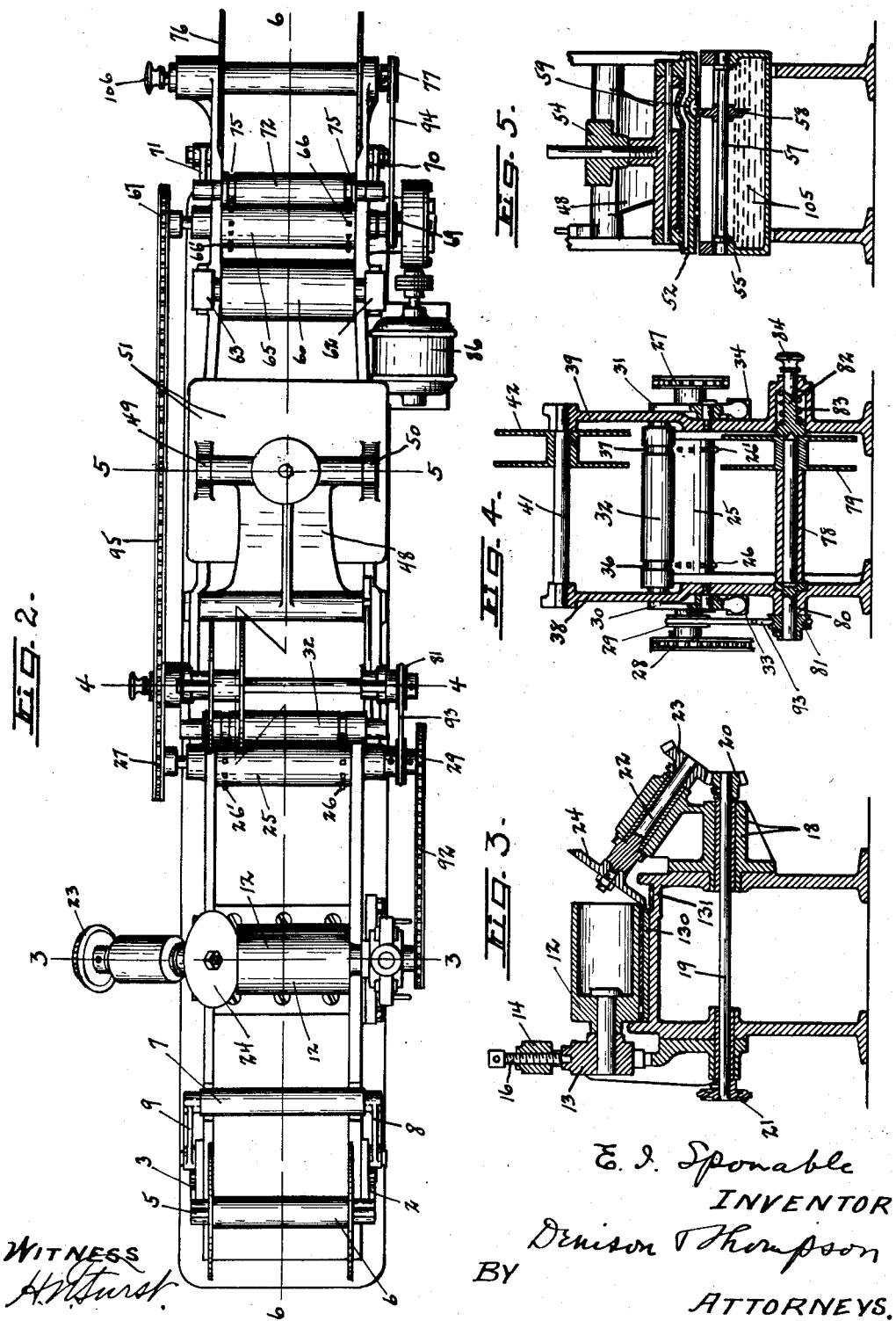

Feb. 7, 1933.  E. I. SPONABLE  1,896,871
FILM SPLICING MACHINE
Filed Feb. 27, 1929   3 Sheets-Sheet 3
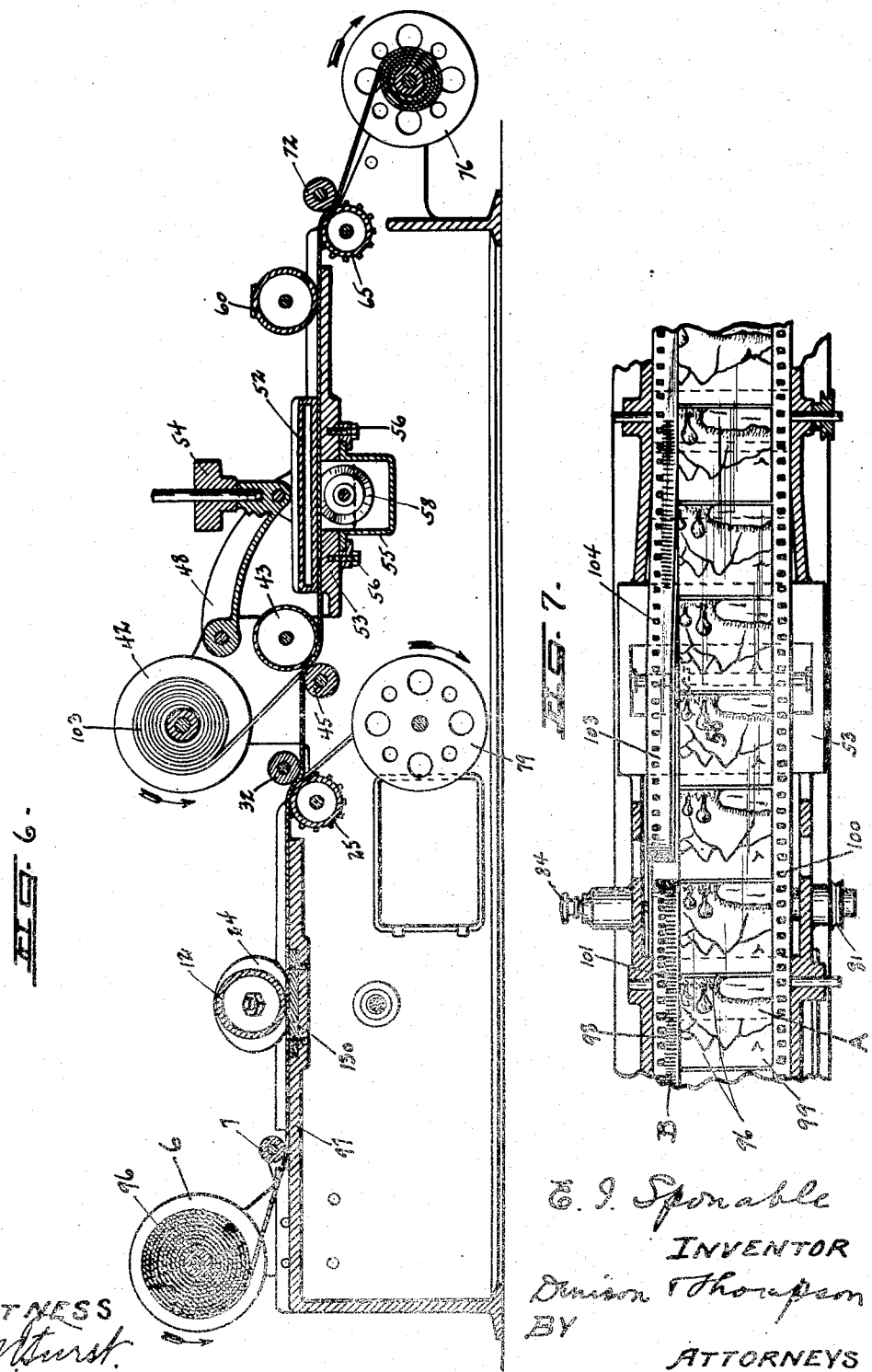

Patented Feb. 7, 1933

1,896,871

UNITED STATES PATENT OFFICE

EARL I. SPONABLE, OF NEW YORK, N. Y., ASSIGNOR TO FOX CASE CORPORATION, OF NEW YORK, N. Y., A CORPORATION OF NEW YORK

FILM SPLICING MACHINE

Application filed February 27, 1929. Serial No. 343,184.

This invention relates to a new and improved method of longitudinally splicing films and apparatus for accomplishing the same, and is particularly designed to be used in longitudinally splicing or securing a film strip having a photographic record of sound thereon to a second film strip having a succession of pictures thereon for moving picture production.

In the display of moving pictures, it is frequently desirable to reproduce in synchronism with pictures on the film, appropriate words or music or other sounds. One method of accomplishing this result is to have pictures on one part of a film and a sound record on another part of the film so that when the pictures and the sounds are reproduced they will be positively in synchronism.

In preparing for exhibition a film carrying picture and sound records it is frequently desirable to change portions of the sound with relation to the picture record. It is also frequently desirable to combine a sound record with a film which carried no sound record when it was originally made. I have found that the desired result can be accomplished by longitudinally splicing or securing a film strip having a sound record thereon to the edge of a second film strip having a picture record thereon. And the main object of my invention is to provide a suitable method and a structure which will separate the sound record strip of film from the picture record strip in combination with apparatus which will then automatically splice the sound record so removed onto a picture record film strip from which the strip for carrying the sound record has been previously removed, or reversely for longitudinally splicing the picture record strip to a sound record strip from which the picture record strip has been previously cut.

Other objects and advantages relate to the details of the structure and the method carried out thereby, all as will more fully appear from the following description taken in connection with the accompany drawings, in which:

Fig. 1 is a side elevation of my device, partially broken away.

Fig. 2 is a top plan view.
Fig. 3 is a section on line 3—3 of Fig. 2.
Fig. 4 is a section on line 4—4 of Fig. 2.
Fig. 5 is a section on line 5—5 of Fig. 2.
Fig. 6 is a section on line 6—6 of Fig. 2.
Fig. 7 is a section on line 7—7 of Fig. 1.
Fig. 8 is an enlarged view of a modified form of pressure roll.
Fig. 9 is an enlarged view of a modified form of bed plate.
Fig. 10 illustrates a section of a spliced film.

Although the specific work for which my apparatus is designed is to cut a moving picture film preparatory to splicing one of the portions to another film, and then to automatically accomplish the splicing operation, it will be evident that it may be used with different types of film to obtain different results so far as the films themselves are concerned.

For example a film carrying a picture record may be cut and a film carrying a sound record spliced thereon; or a film carrying a picture record and a sound record may be cut and the sound portion then spliced onto another film carrying a picture record from which the sound record strip has been previously removed or a film carrying a picture record and a sound record may be cut and a different sound record strip then be spliced upon the portion of the film carrying the picture record. There may also be other uses of the device to obtain other results which may be desired by the operator, although in all cases the machine itself functions to obtain a specific result so far as any given film or films are concerned.

In order to explain the construction and operation of my device, I have here shown the specific parts of which it is constructed and for the purpose of explaining its operation I have shown in position thereon film of a given type. The particular operation which I will describe consists of longitudinally cutting a film which carries both a picture record and a sound record to separate the two strips and then splicing onto the portion of the film carrying the picture record another film strip carrying a sound record.

In the drawings I show a main frame 1 having attached to its upper surface at one end a pair of opposed bearing plates 2 and 3 each carrying on its upper end a slot 4. Slots 4 function as bearings for the shaft 5 of a film reel 6. A film pressure roll 7 is positioned adjacent bearing plates 2 and 3 and has its opposite ends journaled in ends of cranks 8 and 9. The other end of crank 8 is pivotally mounted on bearing plate 2, and similarly one end of crank 9 is pivotally mounted on bearing plate 3. A spring 10 is fastened to frame 1 by means of a rivet 11 and its other end is secured to crank 8 so that the action of spring 10 will normally move crank 8 and film pressure roll 7 downwardly. Adjacent film pressure roll 7 I provide a second pressure roll 12 in parallel relation thereto. Roll 12 has one end journaled in a plate 13 slidably mounted in a frame 14 secured to the side of base 1 by bolts 15 or other convenient means. In the upper end of frame 14 I provide screw 16 which extends downwardly into the slot 17 in which plate 13 is slidably mounted and has one end registered with the top surface 13 so that the movement upwardly and downwardly of plate 13 will be controlled and limited by the screw 16.

On the opposite side of base 1 to which frame 14 is attached I provide a second frame 18 attached to base 1 by rivets (not shown) or other convenient means. A shaft 19 has one end journaled in frame 14 and the other end journaled in frame 18, the last mentioned end being provided with pinion gear 20 and the other being provided with a sprocket wheel 21. A stub shaft 22 is journaled in the upper portion of frame 18 and is disposed with its axis in angular relation to the axis of press roll 12. One end of stub shaft 22 carries a spiral gear 23 in mesh with pinion gear 20 and the other end of stub shaft 22 carries a beveled edge cutting wheel 24 with its cutting edge adjacent the end of pressure roll 12. The cutting disk 24 is inclined with respect to the plane of the film so that the edges of the film strips adjacent the cut will be inclined, affording a more extensive surface for subsequent securement than would be obtained if the cut were made normal to the plane of the film. Further, the frame 1 carries a supplemental bed plate 130 underlying the film pressure roll 12 for co-action therewith and this plate is preferably formed of a hardened tool steel plate and has its outer edge inclined to correspond with the inclination of the cutting edge of the cutter 24, a shouldered shelf 131 being provided for receiving the severed edge of the film.

Adjacent the pressure roll 12, I provide a film driving sprocket roll 25 having adjacent each edge a plurality of sprocket teeth 26 and 26' in circumferential spaced relation. Roll 25 has its ends journaled in opposite sides of base 1 and is disposed in parallel relation to pressure roll 12. Roll 25 extends outwardly from both sides of base 1 and carries on one end a sprocket wheel 27 and on the other end a sprocket wheel 28. A pulley 29 is secured to roll 25 between sprocket wheel 28 and base 1.

Adjacent sprocket roll 25 a bell crank 30 is pivotally mounted on one side of base 1 and a similar bell crank 31 is pivotally mounted on the opposite side of base 1. A film pressure roller 32 has one end journaled in the upper end of bell crank 30 and has its other end journaled in the upper end of bell crank 31. Adjacent the lower end of bell crank 30, I provide on base 1 a stop 33 and adjacent the lower end of bell crank 31 a similar stop 34. A spring 35 is interposed between stop 33 and bell crank 30 and a similar spring (not shown) is interposed between stop 34 and bell crank 31. The relation of the last described parts is such that the spring 35 will tend to move bell cranks 30 and 31 about their pivots to move pressure roll 32 downwardly into contact with sprocket roll 25. Pressure roll 32 is provided with circular slots 36 and 37 into which the sprocket teeth 26 and 26' on sprocket roll 25 extend.

Adjacent pressure roll 32, base 1 carries opposed upwardly extending plates 38 and 39. In the upper face of plate 38, I provide a U slot 40 and plate 39 is provided with a similar U slot (not shown). The U slots 40 act as bearings for a shaft 41 upon which is positioned a film reel 42.

A guide roll 43 is journaled in plates 38 and 39 beneath reel 42. A crank 44 is pivotally mounted on one side of base 1, a similar crank (not shown) is journaled in the opposite side of base 1. A pressure roll 45 is journaled in the upper ends of cranks 44 in parallel relation with guide roll 43. A stop 46 is positioned on base 1 in spaced relation to the lower end of crank 44 and a similar stop (not shown) is positoned on the opposite side of base 1 adjacent the lower end of the crank carried on that side of base 1. Springs 47, one only being shown, are interposed between stops 46 and the lower end of cranks 44. The action of springs 47 tends to move cranks 44 about their pivotes to carry pressure roll 45 forwardly into contact with guide roll 43.

A plate 48 has one end provided with trunnions (not shown) one of which is journaled in plate 38 and the other end journaled in plate 39 to permit the movement of plate 48 towards and from base 1. The lower end of plate 48 is provided with opposed trunnions (not shown) journaled in opposed vertically extending ears 49 and 50 which are positioned on the upper surface of a pressure plate 51 to permit a swinging movement of plate 51 with reference to plate 48. Plate 51 is provided on the under surface with an electric heater 52 energized from any convenient source of potential, none here being shown.

A horizontal bearing plate 53 is carried by base 1 and is positioned beneath plate 51 so that when plate 48 is lowered electrical heater 52, carried by plate 51, will contact with the upper surface of bearing plate 53. A weight 54 is secured on the upper surface of plate 48 above the central portion of plate 51 to assist in holding plate 51 in position on bearing plate 53.

A pot 55 for containing an adhesive or cement is secured to the under surface of bearing plate 53 by bolts 56 or other convenient means. A shaft 57 has its opposite ends journaled in the wall of pot 55 and carries a beveled edge disk 58 so positioned that its edge extends upwardly above bearing plate 53 into a recess 59 formed in the under surface of electrical heater 52.

A pressure roll 60 is positioned on the upper surface of bearing plate 53 adjacent the electrical heater 52. Pressure roll 60 has its opposite ends journaled in bearings 61, one only being shown, which are slidably mounted in frames 62 and 63 secured to the opposite sides of base 1. Springs 64, one only being shown, are interposed between the top surface of bearings 61 and frames 62 and 63 so that the pressure roll 60 is at all times spring pressed towards bearing plate 53.

Adjacent the end of bearing plate 53 is positioned a sprocket roller 65 having its opposite ends journaled in base 1 and carrying adjacent each of its ends a plurality of sprockets 66 and 66' in circumferential spaced relation. The ends of sprocket roll 65 extend outwardly from the base 1. One end carries a sprocket wheel 67 and the other end carries a spiral gear 68. A pulley 69 is mounted on sprocket roller 65 between spiral gear 68 and base 1.

A bell crank 70 is pivotally mounted on one side of base 1 and a similar bell crank 71 is pivotally mounted on the opposite side of base 1. A pressure roller 72 has its ends journaled in the upper ends of bell cranks 70 and 71. Stops 73, one only being shown, are positioned on the sides of base 1, one adjacent the lower end of bell crank 70 and the other adjacent the lower end of bell crank 71. Springs 74 are interposed between stops 73 and lower end of bell cranks 70 and 71 to normally move bell cranks 70 and 71 about their pivots to move pressure roll 72 downwards towards sprocket roll 65. Pressure roll 72 is provided adjacent each of its ends with a circumferential recess 75 in which sprockets 66 and 66' are received when pressure roll 72 is in position on sprocket roll 65.

A take-up film reel 76 is rotatably mounted on base 1 and carries at one end a pulley 77 disposed in the same plane as the plane in which the pulley 69 is disposed.

In the interior of base 1 adjacent the bottom thereof and below reel 42 is journaled a shaft 78 carrying a take-up reel 79 disposed in approximately the same plane as the plane in which the reel 42 is disposed. One end of shaft 78 is joined by a separable tongue and groove connection to the inner end of a stub shaft 80 journaled in base 1. The outer end of stub shaft 80 carries a pulley 81 disposed in the same plane as the plane in which pulley 29 is disposed. The opposite end of shaft 78 is journaled in a bearing 82 slidably mounted in base 1 and spring pressed towards shaft 78 by a spiral spring 83. A nob 84 is provided on the end of bearing 82 so that bearing 82 may be retracted against the pressure of spring 83 to withdraw bearing 82 from the end of shaft 78 to permit the removal of shaft 78 and reel 79 from stub shaft 80 and from the machine. A door 85 is provided in base 1 to permit the operator to insert or withdraw, from the machine, shaft 78 carrying reel 79. For the purpose of providing motive power for the different parts of my apparatus, I provide an electrical motor 86 to be run from any convenient source of potential, none here being shown. The armature shaft 87 of motor 86 is connected through a coupling 88 to a shaft 89 journaled in a gear case 90. Shaft 89 carries a worm-gear 91 in mesh with spiral gear 68.

Sprocket wheel 21 and sprocket wheel 28 are operatively connected together by means of an endless chain 92. Pulleys 29 and 81 are operatively connected together by means of an endless belt 93. Pulleys 69 and 77 are operatively connected together by means of an endless spring belt 94. Sprocket wheel 27 is operatively connected to sprocket wheel 67 by means of an endless chain 95.

When the motor is running the rotary motion of the armature shaft 87 through worm-gear 91 and spiral gear 68 will be transmitted to sprocket roll 65, and through sprocket 67, chain 95 and sprocket 27 to sprocket roll 25. The rotation of sprocket roll 25 will, through pulley 29, belt 93 and pulley 81 be transmitted to shaft 78. Rotary movement will also be transmitted to shaft 19 from sprocket roll 25 through sprocket 28, chain 92 and sprocket 21. The rotary movement of shaft 19, through pinion gear 20, spiral gear 23, will be transmitted to cutter 24. Rotary motion will be transmitted from sprocket roll 65 through pulley 69, belt 94 and pulley 77 to take-up reel 76.

*Operation*

The operation of my apparatus may perhaps be best understood from Figures 6 and 7.

A reel 6 having thereon a film 96 which carries a picture record —A— and a sound record —B— is placed in position on bearing plates 2 and 3. One end of the film 96 is brought downwardly and forwardly under pressure roll —7— and between bed plate —130— and pressure roll 12. The motor is then started so that rotary cutter 24 acting in conjunction with bed plate —130— will sever the sound record 98 from the picture record 99 while the film is being drawn forwardly in the machine. When sufficient of the film has been drawn forwardly the machine is stopped and the sprocket holes —100— and —101— in picture record —99— and the sound record —98— are placed in position on the sprocket teeth 26 and 26' respectively on roll 25 and underneath pressure roll 32. The portion 98 of the film carrying the sound record is then drawn downwardly and secured on reel 79.

The machine is then again started to move the film forwardly, and the portion —99— of the film carrying the picture record is placed between guide roll 43 and pressure roll 45. It is then moved forwardly beneath electrical heater 52, plate 48 being raised to move electrical heater 52 from bearing plate 53, plate 48 being releasedly held in raised position by means of a latch —102— shown in Fig. 1. The portion 99 of the film is then carried forwardly beneath pressure roll 60. The machine is then stopped and the ratchet holes —100— are placed in registration on ratchet teeth 66 on sprocket roll —65—, and the portion —99— is placed under pressure roll —72— and then on reel —76—.

A reel 42 carrying a film strip 103 which has a sound record thereon is then placed in position in slots 40 in plates 38 and 39. This film strip 103 has an inclined edge 140 corresponding to the inclination of the edge 141 of the film picture strip 99. The end of film 103 is then brought downwardly between guide roll 43 and pressure roll 45 and is moved forwardly on the upper surface of bearing plate 53 and beneath electrical heater 52. It is then carried forwardly underneath pressure roll 60 and ratchet holes 104 are then placed on ratchet teeth 66' on ratchet roll 65. Film 103 is then moved forwardly beneath pressure roll 72 and is secured on reel 76.

With the films 98, 99 and 103 in the position just described, latch 102 is released from plate 48 and electrical heater 52 is lowered onto the top surface of films 99 and 103 and connected to a source of potential. The motor 86 is then started with the result that film strips 98, 99 and 103 will be drawn forwardly through the machine, and the cutter 24 will continue to separate film 96 into the two film strips 98 and 99.

As the films 99 and 103 pass beneath the electrical heater 52 and over pot 55 their inclined edges will contact with disk 58 to cause the same to rotate and carry upwardly onto the edges of films 99 and 103 an adhesive or cement from the supply 105 in the pot 55. Films 99, and 103, carrying on their edges adhesive or cement 105, will be moved forwardly under pressure roll 60, causing the inclined contacting edges of film strips 99 and 103 to adhere together. The film so made by the joinder of films 99 and 103 will be reeled up on reel 76.

When the completely finished film is in position on reel 76, the latter may be removed from the machine to permit the substitution of an empty reel. The removal of reel 76 is permitted by a construction of parts which, though not here shown in detail, is similar to the construction of parts heretofore described in explaining the assembly of parts on which reel 79 is carried, nob 106, similar in design and use to nob 84, being supplied for the purpose.

As heretofore explained, my machine may be used to sever and join together different combinations of films and records thereon, depending upon the result which the operator desires to obtain in a finished film.

The film to be cut is preferably a negative film, so that the longitudinally spliced film is a negative film from which any number of positives can be produced and the spliced film is thereby used only in printing and is not subjected to the hardship of repeated and careless use in projecting outfits in theatres and the like. As illustrated in Figures 8 and 9, it may be preferable to have the film pressure rolls and the bed plates formed with grooves or recesses 142 and 143 in their surfaces corresponding to the added thickness of the film where the picture portion and the sound record portion are carried, leaving raised tracks for contact with the portions of the film from which the sensitized material has been removed. These recesses may be of a depth of .015 so that the picture and sound record portions of the film will not be injured by friction with the surfaces of the rolls or the bed plate.

It will be understood that the width of the reel 42 and the width of the reel 79 may be varied as desired, as may their relative lateral positions in the device, depending upon whether it is desired to secure a sound record film strip to a picture record film strip, or to secure a picture record film strip to a sound record film strip. That is to say, in the concrete example of operation just described a sound record strip may be secured to the picture record strip which was on the film initially fed into the machine, the sound record strip of the initially fed film being reeled up for future uses, or a new picture record can be joined to the portion of the initially fed film strip, which carries the sound record.

It will also be understood that sources of power other than an electrical motor may be used for the operation of the machine, and the speed at which the machine is operated may be varied, as may be the relative arrangement of various parts, for although I have shown and described a specific structure and form of parts as an example of an embodiment of my invention, I do not desire to restrict myself to the exact size, shape, or relation of parts as various changes may be made within the scope of the appended claims.

I claim:

1. In a device of the class described, a frame, a reel rotatably mounted on the frame, a film on the reel, a cutter mounted on the frame, means for moving the film past the cutter whereby the film will be divided longitudinally into two parts, a second reel mounted on the frame, a film on the second reel, a cement receptacle mounted on the frame, cement in the cement receptacle, means for moving one part of the first named film and the second named film in juxtaposition past the cement receptacle, means for placing cement upon the adjacent edges of the two last mentioned films, means for exerting pressure upon the edges of the films having cement thereon whereby the two films will be joined together, a third reel on the frame, and means for winding the joined film on the last named reel.

2. In a device of the class described, a frame, a reel rotatably mounted on the frame, a film on the reel, a circular cutter rotatably mounted on the frame, means for moving film past the cutter, means for rotating the cutter whereby the film will be divided longitudinally into two parts, a second reel mounted on the frame, a film on the second named reel, a cement receptacle mounted on the frame, cement in the receptacle, means for moving the last named film and one part of the first named film in juxtaposition past the cement receptacle, means for placing cement on the adjacent edges of the last named films, means for exerting pressure on the edges of said films having cement thereon whereby the two films will be joined together, a third reel mounted on the frame, and means for winding the joined film on the last named reel.

3. In a device of the class described, a frame, means for feeding a film through the frame, means for cutting the film longitudinally, means for feeding a second film through the frame, and means for joining two films together, said last mentioned means comprising an adhesive pot, a rotatable wheel in the adhesive pot adapted to contact the edges of two films and a pressure roll adapted to contact the upper surface of two films.

4. In a device of the class described, a frame, means for feeding a strip of material through the frame, means for cutting the strip of material longitudinally, means for feeding a second strip of material through the frame, and means for joining two strips of material together, said last mentioned means comprising a cement pot, a rotatable wheel in the cement pot adapted to contact the edges of two strips and a pressure roll adapted to contact the upper surface of two strips.

5. In an apparatus of the class described, means for cutting a film longitudinally to produce a plurality of film strips, and means for uniting a longitudinal edge of one of said film strips to the longitudinal edge of a third film strip to produce a unitary article.

6. In an apparatus of the class described, means for cutting a film longitudinally to produce a plurality of strips with similarly inclined surfaces at their cut edges, and means for uniting a longitudinal edge of one of said strips to the longitudinal edge of a third strip having a similarly inclined longitudinal edge to produce a unitary article.

7. In a device of the class described, a frame, a reel rotatably mounted on the frame, a film on the reel, a cutter mounted on the frame, means for moving the film past the cutter whereby the film will be divided longitudinally into two parts, a second reel mounted on the frame, a film on the second reel, means for moving one part of the first-named film and the second-named film in juxtaposition along the frame, means for placing cement upon one of the adjacent edges of the two last-named films, means for exerting pressure upon the adjacent edges of the films whereby the two films will be joined together, a third reel on the frame, and means for winding the joined film on the last-named reel.

In witness whereof I have hereunto set my hand this 14th day of February, 1929.

EARL I. SPONABLE.